United States Patent
Zhang (10) Patent No.: US 9,584,842 B2
(45) Date of Patent: Feb. 28, 2017

(54) METHOD AND APPARATUS FOR PLAYING MULTIMEDIA RESOURCE

(71) Applicant: ZTE Corporation, Shenzhen (CN)

(72) Inventor: Wei Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/915,045

(22) PCT Filed: Nov. 13, 2013

(86) PCT No.: PCT/CN2013/087071
§ 371 (c)(1),
(2) Date: Feb. 26, 2016

(87) PCT Pub. No.: WO2014/161310
PCT Pub. Date: Oct. 9, 2014

(65) Prior Publication Data
US 2016/0212471 A1    Jul. 21, 2016

(30) Foreign Application Priority Data
Aug. 30, 2013    (CN) .......................... 2013 1 0390345

(51) Int. Cl.
*H04N 21/262*    (2011.01)
*H04N 21/258*    (2011.01)
(Continued)

(52) U.S. Cl.
CPC . *H04N 21/26258* (2013.01); *H04N 21/25825* (2013.01); *H04N 21/25875* (2013.01);
(Continued)

(58) Field of Classification Search
CPC combination set(s) only.
See application file for complete search history.

(56) References Cited

U.S. PATENT DOCUMENTS 7,159,174 B2    1/2007    Johnson
8,813,127 B2 *  8/2014    Liu ................... G06F 17/30053
                                                        341/50
(Continued)

FOREIGN PATENT DOCUMENTS

CN    102143385 A    8/2011
CN    102790764 A    11/2012
(Continued)

OTHER PUBLICATIONS

Supplementary European Search Report in European application No. 13881343.1, mailed on Aug. 1, 2016.
(Continued)

*Primary Examiner* — Mulugeta Mengesha
(74) *Attorney, Agent, or Firm* — Oppedahl Patent Law Firm LLC (57) ABSTRACT

Disclosed is a method and apparatus for playing media resources. The method includes that: a multimedia resource server is searched for multimedia resources including identity attribute information, and a first play list is generated according to a search result; when there is a first multimedia player that is pre-selected, the first play list is searched for multimedia resources corresponding to multimedia file formats supported by the first multimedia player, and a second play list is generated on the basis of the found multimedia resources; and multimedia resources in the second play list are sequentially pushed to the first multimedia player for playing. By means of the technical solutions of the present disclosure, favorite multimedia resources of a user can be conveniently selected, and the favorite multimedia resources of the user are correspondingly played in a selected multimedia player.

12 Claims, 6 Drawing Sheets

(51) Int. Cl.
  *H04N 21/414* (2011.01)
  *H04N 21/436* (2011.01)
  *H04N 21/482* (2011.01)
  *H04N 21/6543* (2011.01)
(52) U.S. Cl.
  CPC . *H04N 21/26291* (2013.01); *H04N 21/41407* (2013.01); *H04N 21/43615* (2013.01); *H04N 21/4825* (2013.01); *H04N 21/4828* (2013.01); *H04N 21/6543* (2013.01)

(56) References Cited

U.S. PATENT DOCUMENTS

| | | | | |
|---|---|---|---|---|
| 8,869,207 | B1* | 10/2014 | Earle | H04N 21/4622 725/37 |
| 2003/0151618 | A1 | 8/2003 | Johnson | |
| 2005/0210507 | A1* | 9/2005 | Hawkins | G06F 17/30035 725/46 |
| 2007/0157260 | A1* | 7/2007 | Walker | H04N 7/163 725/86 |
| 2007/0237090 | A1* | 10/2007 | Kim | H04L 12/2803 370/252 |
| 2009/0013001 | A1 | 1/2009 | Park | |
| 2009/0282076 | A1 | 11/2009 | Werstiuk | |
| 2010/0250778 | A1* | 9/2010 | Jonsson | H04N 21/43615 709/246 |
| 2012/0263434 | A1* | 10/2012 | Wainner | H04N 5/765 386/241 |
| 2014/0324944 | A1* | 10/2014 | Christopher | H04L 67/025 709/203 |

FOREIGN PATENT DOCUMENTS

| | | |
|---|---|---|
| CN | 103106251 A | 5/2013 |
| WO | 2009137469 A1 | 11/2009 |

OTHER PUBLICATIONS

International Search Report in international application No. PCT/CN2013/087071, mailed on Mar. 27, 2014.

English Translation of the Written Opinion of the International Search Authority in international application No. PCT/CN2013/087071, mailed on Mar. 27, 2014.

* cited by examiner

METHOD AND APPARATUS FOR PLAYING MULTIMEDIA RESOURCE

TECHNICAL FIELD

The present disclosure relates to the technical field of communications, and in particular to a method and apparatus for playing multimedia resources.

BACKGROUND

With the continuous development of digital home concept applications, a Digital Living Network Alliance (DLNA) device serves as an apparatus directly facing users, a good user experience thereof undoubtedly being a big selling point of the DLNA device.

DLNA devices may be classified into home network devices, mobile handheld devices and home interoperability devices.

A home network device includes a multimedia resource server such as a Digital Media Server (DMS), a multimedia player such as a Digital Media Player (DMP), a Digital Media Renderer (DMR), a multimedia controller such as a Digital Media Controller (DMC), and a multimedia printer such as a Digital Media Printer (DMPr).

The mobile handheld device includes a mobile multimedia resource server such as a Mobile Digital Media Server (M-DMS), a mobile multimedia player such as a Mobile Digital Media Player (M-DMP), a mobile multimedia uploader such as a Mobile Digital Media Uploader (M-DMU), a mobile multimedia downloader such as a Mobile Digital Media Downloader (M-DMD), and a mobile multimedia controller such as a Mobile Digital Media Controller (M-DMC).

The home interoperability device includes a Mobile Network Connectivity Function (M-NCF) and a Mobile Interoperability Unit (MIU).

The multimedia resource server may be any device having a file storage function in DLNA interconnection devices, and the multimedia player may be any device having a display function and an audio/video playing function in the DLNA interconnection devices.

3 interaction modes of playing media resources are specified in a DLNA protocol:

1. a multimedia resource server can actively push stored audio/video files to any one DMR device for playing;

2. a multimedia player can actively search the multimedia resource server and select the audio/video files in the multimedia resource server for playing;

3. the audio/video files in the multimedia resource server can be read via the multimedia controller, and the selected audio/video files are pushed to the multimedia player for playing.

In currently existing DLNA applications, multiple multimedia resource servers may exist in a digital home network, each multimedia resource server is provided with some resources in which users are interested, the audio/video files in these multimedia resource servers can be played in different multimedia players, the multimedia resource servers may actively push multimedia resources to the multimedia players, but the multimedia resource servers do not care whether the multimedia resources can be played in the multimedia players. The multimedia players will search for media resources in some multimedia resource servers for playing, but the multimedia players do not know whether to support the searched media resources. Similarly, a user may select some media resources from the multiple multimedia resource servers as his/her own play lists, but it is impossible for the user to enjoy all media in all lists once, so that in a next usage process, the user needs to re-select his/her own media resources to be played. The media resources in the multimedia resource servers in the digital home network continuously increase, and it is complicated for the user to select a resource and a playing device from huge media resource libraries in the multimedia resource servers and to judge whether the playing device can play this resource, thereby influencing the user experience. For example, the user searches for the resources each time and needs to select the multimedia players each time.

SUMMARY

The embodiments of the present disclosure are mainly intended to provide a method and apparatus for playing multimedia resources, and aim at conveniently selecting favourite multimedia resources of a user and correspondingly playing the favourite multimedia resources of the user in a multimedia player.

An embodiment of the present disclosure provides a method for playing multimedia resources, which may include that:

a multimedia resource server is searched for multimedia resources including identity attribute information, and a first play list is generated according to a search result;

when there is a first multimedia player that is pre-selected, the first play list is searched for multimedia resources corresponding to multimedia file formats supported by the first multimedia player, and a second play list is generated on the basis of the found multimedia resources; and multimedia resources in the second play list are sequentially pushed to the first multimedia player for playing.

Preferably, after the multimedia resource server is searched for the multimedia resources including the identity attribute information and the first play list is generated according to the search result, the method may further include that:

when the first multimedia player is not pre-selected, a multimedia player which supports playing of maximum multimedia resources in the first play list is determined from a pre-determined multimedia player list, and the determined multimedia player is set as a second multimedia player;

a third play list is generated according to the multimedia resources in the first play list, which are supported to be played by the second multimedia player; and multimedia resources in the third play list are sequentially pushed to the second multimedia player for playing.

Preferably, after the multimedia resources in the second play list are sequentially pushed to the first multimedia player for playing, the method may further include that:

when all media resources in the second play list have been pushed to the first multimedia player and there is a third multimedia player that is pre-selected, a fourth play list is generated by subtracting the multimedia resources in the second play list from the multimedia resources in the first play list;

when there is the third multimedia player that is pre-selected, the fourth play list is searched for multimedia resources corresponding to multimedia file formats supported by the third multimedia player, and a fifth play list is generated on the basis of the found multimedia resources; and multimedia resources in the fifth play list are sequentially pushed to the third multimedia player for playing.

Preferably, before the multimedia resource server is searched for the multimedia resources including the identity attribute information and the first play list is generated according to the search result, the method may further include that:

a selection instruction for the multimedia resources on the multimedia resource server is received, and identity information is added into attribute information of the selected multimedia resources.

Preferably, before the first play list is searched for the multimedia resources corresponding to the multimedia file formats supported by the first multimedia player and the second play list is generated on the basis of the found multimedia resources, the method may further include that:

device information of the first multimedia player is acquired to obtain the multimedia file formats supported by the first multimedia player.

An embodiment of the present disclosure further provides an apparatus for playing multimedia resources, which may include a first generation module, a second generation module connected to the first generation module, and a first pushing module connected to the second generation module, wherein the first generation module is configured to search a multimedia resource server for multimedia resources including identity attribute information, and generate a first play list according to a search result;

the second generation module is configured to search, when there is a first multimedia player that is pre-selected, the first play list for multimedia resources corresponding to multimedia file formats supported by the first multimedia player, and generate a second play list on the basis of the found multimedia resources; and the first pushing module is configured to sequentially push multimedia resources in the second play list to the first multimedia player for playing.

Preferably, the apparatus may further include a first setting module connected to the first generation module, a third generation module connected to the first setting module, and a second pushing module connected to the third generation module, wherein the first setting module is configured to determine, when the first multimedia player is not pre-selected, a multimedia player which supports playing of maximum multimedia resources in the first play list from a pre-determined multimedia player list, and set the determined multimedia player as a second multimedia player;

the third generation module is configured to generate a third play list according to the multimedia resources in the first play list, which are supported to be played by the second multimedia player; and the second pushing module is configured to sequentially push multimedia resources in the third play list to the second multimedia player for playing.

Preferably, the apparatus may further include a fourth generation module connected to the first pushing module, a fifth generation module connected to the fourth generation module, and a third pushing module connected to the fifth generation module, wherein the fourth generation module is configured to generate, when all media resources in the second play list have been pushed to the first multimedia player by the first pushing module and there is a third multimedia player that is pre-selected, a fourth play list by subtracting the multimedia resources in the second play list from the multimedia resources in the first play list;

the fifth generation module is configured to search, when there is the third multimedia player that is pre-selected, the fourth play list for multimedia resources corresponding to multimedia file formats supported by the third multimedia player, and generate a fifth play list on the basis of the found multimedia resources; and the third pushing module is configured to sequentially push multimedia resources in the fifth play list to the third multimedia player for playing.

Preferably, the apparatus may further include an attribute modification module connected to the first generation module, and the attribute modification module is configured to receive a selection instruction for the multimedia resources on the multimedia resource server, and add identity information into attribute information of the selected multimedia resources.

Preferably, the second generation module includes an acquisition unit, which is configured to acquire device information of the first multimedia player to obtain the multimedia file formats supported by the first multimedia player.

In the embodiments of the present disclosure, the multimedia resource server is searched for multimedia resources including identity attribute information, a first play list is generated according to a search result, multimedia resources corresponding to multimedia file formats supported by the first multimedia player are determined according to a selected first multimedia player, a second play list is generated, and multimedia resources in the second play list are pushed to the first multimedia player for playing. By means of the technical solutions in the embodiments of the present disclosure, favourite multimedia resources of a user can be conveniently selected, and the favourite multimedia resources of the user are correspondingly played in the selected first multimedia player.

DETAILED DESCRIPTION

It is to be understood that the embodiments described herein are only intended to explain the present disclosure, and do not limit the present disclosure.

Figure 1:
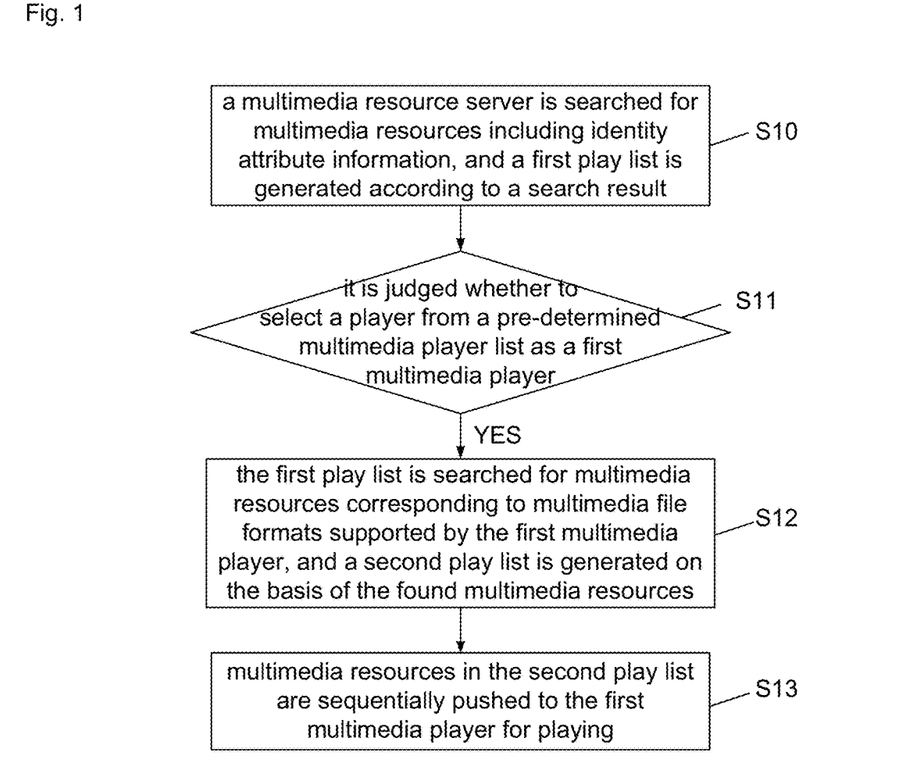
FIG. 1 is a flowchart of a first embodiment for a method for playing multimedia resources according to embodiments of the present disclosure.

As shown in FIG. 1, FIG. 1 is a flowchart of a first embodiment for a method for playing multimedia resources according to embodiments of the present disclosure, and the method includes that:

S10: a multimedia resource server is searched for multimedia resources including identity attribute information, and a first play list is generated according to a search result.

In a home network, at least one multimedia resource server can be included. In this embodiment, the multimedia resource server can be a DMS. Formats of multimedia resources stored in each DMS can be the same or can be different. For example, one digital media server (DMS) stores multimedia resources in a Motion Picture Experts Group (MPEG) format, another DMS stores multimedia resources in an MPEG format and a 3GP format (3GP is a video coding format for 3G streaming media), and another DMS stores multimedia resources in an MPEG format, a 3GP format, an Audio Video Interleaved (AVI) format, an Advanced Streaming Format (ASF), a Windows Media Video (WMV) format and a Real Media Variable Bit rate (RMVB) format.

In the step S10, each multimedia resource server in the home network is searched for multimedia resources including identity information, the identity information is user identity information, for example, if the user identity information is 123456, then each multimedia resource server is searched for the multimedia resources including the user identity information 123456, and then the first play list is generated by the found multimedia resources meeting requirements, attribute information of the multimedia resources in the first play list includes the user identity information 123456, and the multimedia resources in the first play list are multimedia resources in which a user having the identity information 123456 is interested.

S11: it is judged whether a player is selected from a pre-determined multimedia player list as a first multimedia player, and if such a player is selected, step S12 is executed.

In the home network, at least one multimedia player can be included, which can be a DMP or a DMR; available multimedia players are added into a multimedia player list, each multimedia player in the multimedia player list can support at least one multimedia file format, and the multimedia file formats supported by all the multimedia players can be totally or partially the same or can be totally different. The user can select any one multimedia player from the multimedia player list as the first multimedia player. For example, the multimedia player list includes a first DMP, a second DMP, a first digital media renderer (DMR), a second DMR and the like, and the user can select the first DMP as the first multimedia player.

S12: the first play list is searched for multimedia resources corresponding to multimedia file formats supported by the first multimedia player, and a second play list is generated on the basis of the found multimedia resources.

In the step S12, the first play list is searched for the multimedia resources corresponding to the multimedia file formats supported by the first multimedia player. If the first multimedia player is the first DMP and the multimedia file formats supported by the first DMP are MPEG and 3GP formats, then the first play list is searched for the multimedia resources which are in MPEG and 3GP multimedia file formats, and the second play list is generated by the found multimedia resources meeting requirements, i.e., multimedia file attributes of multimedia resources in the second play list all include the user identity information 123456, and the multimedia resources in the second play list are multimedia resources which can be played by the first multimedia player.

S13: the multimedia resources in the second play list are sequentially pushed to the first multimedia player for playing.

In the step S13, a first multimedia resource in the second play list is firstly pushed to the first multimedia player, and when feedback information received from the first multimedia player is "HAVE BEEN PLAYED", the played multimedia resource is marked as "PLAYED", a next multimedia resource in the second play list is pushed to the first multimedia player, and when the feedback information received from the first multimedia player is "HAVE BEEN PLAYED", next multimedia resources are sequentially pushed to the first multimedia player.

By means of the method for playing multimedia resources, the multimedia resource server is searched for the multimedia resources including the identity attribute information, the first play list is generated according to the search result, the multimedia resources corresponding to the multimedia file formats supported by the first multimedia player are determined according to the selected first multimedia player, the second play list is generated, and the multimedia resources in the second play list are pushed to the first multimedia player for playing. By means of the embodiment of the present disclosure, the favourite multimedia resources of the user can be conveniently selected, and the favourite multimedia resources of the user are correspondingly played in the selected first multimedia player.

Figure 2:
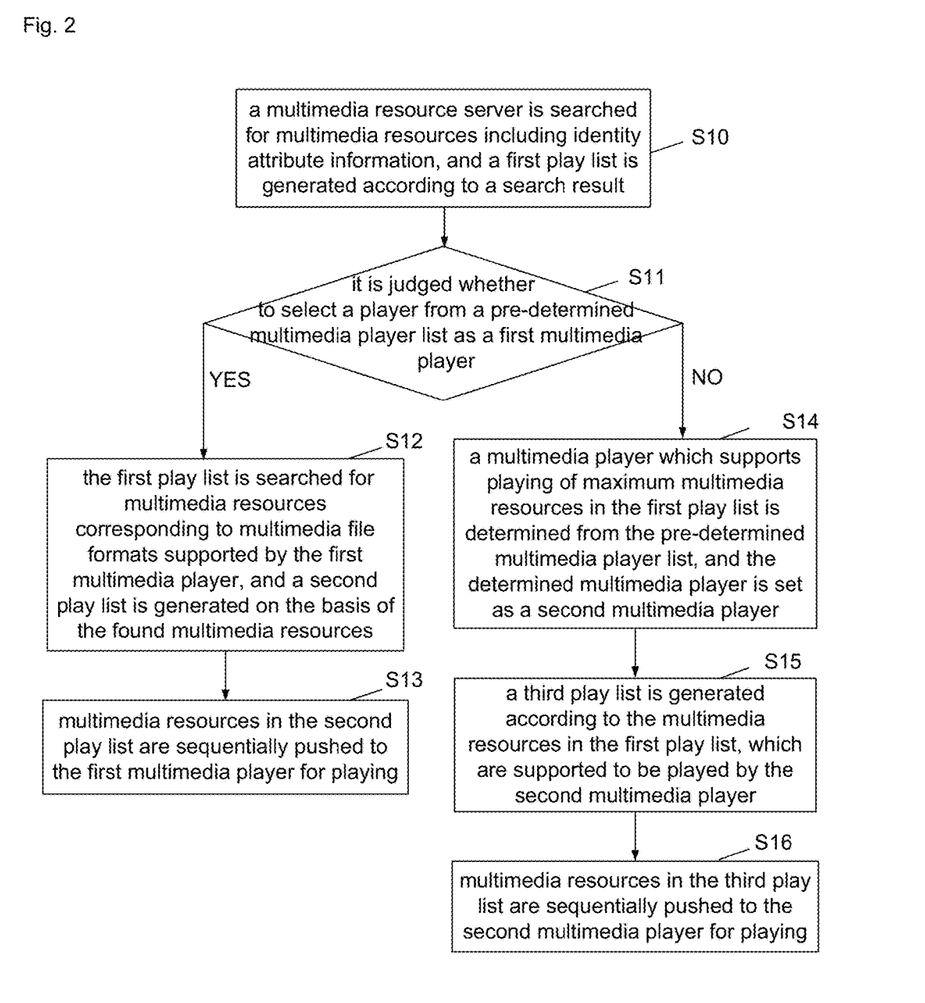
FIG. 2 is a flowchart of a second embodiment for a method for playing multimedia resources according to embodiments of the present disclosure.

As shown in FIG. 2, FIG. 2 is a flowchart of a second embodiment for a method for playing multimedia resources according to embodiments of the present disclosure.

On the basis of the first embodiment for the method for playing multimedia resources, when a judgment result in step S11 is NO, namely the user does not select a player from the pre-determined multimedia player list as the first multimedia player, the method further includes that:

S14: a multimedia player which supports playing of maximum multimedia resources in the first play list is determined from the pre-determined multimedia player list, and the determined multimedia player is set as a second multimedia player.

When the judgment result in step S11 shows that the user does not select a player from the pre-determined multimedia player list as the first multimedia player, a multimedia player is selected from the pre-determined multimedia player list as the second multimedia player in step S14. Specifically, the number of the multimedia resources in the first play list, which are supported to be played by each multimedia player in the multimedia player list, is acquired, for example, the number of the multimedia resources in the first play list, which are supported to be played by the first DMP, is 10, the number of the multimedia resources in the first play list, which are supported to be played by the second DMP, is 20, the number of the multimedia resources in the first play list, which are supported to be played by the first DMR, is 30, and the number of the multimedia resources in the first play list, which are supported to be played by the second DMR, is 40; the second DMR capable of playing the maximum multimedia resources in the first multimedia player list is set as the second multimedia player.

S15: a third play list is generated according to the multimedia resources in the first play list, which are supported to be played by the second multimedia player.

In the step S15, the first play list is searched for multimedia resources corresponding to multimedia file formats supported by the second multimedia player. If the second multimedia player is the second DMR and the multimedia file formats supported by the second DMR are MPEG, 3GP, RMVB and AVI, then the first play list is searched for the multimedia resources which are in MPEG, 3GP, RMVB and AVI multimedia file formats, and the third play list is generated by the found multimedia resources meeting requirements.

S16: multimedia resources in the third play list are sequentially pushed to the second multimedia player for playing.

In the step S16, a first multimedia resource in the third play list is firstly pushed to the second multimedia player, and when feedback information received from the second multimedia player is "HAVE BEEN PLAYED", the played multimedia resource is marked as "PLAYED", a next multimedia resource in the third play list is pushed to the second multimedia player, and when the feedback information received from the second multimedia player is "HAVE BEEN PLAYED", next multimedia resources are sequentially pushed to the second multimedia player.

Figure 3:
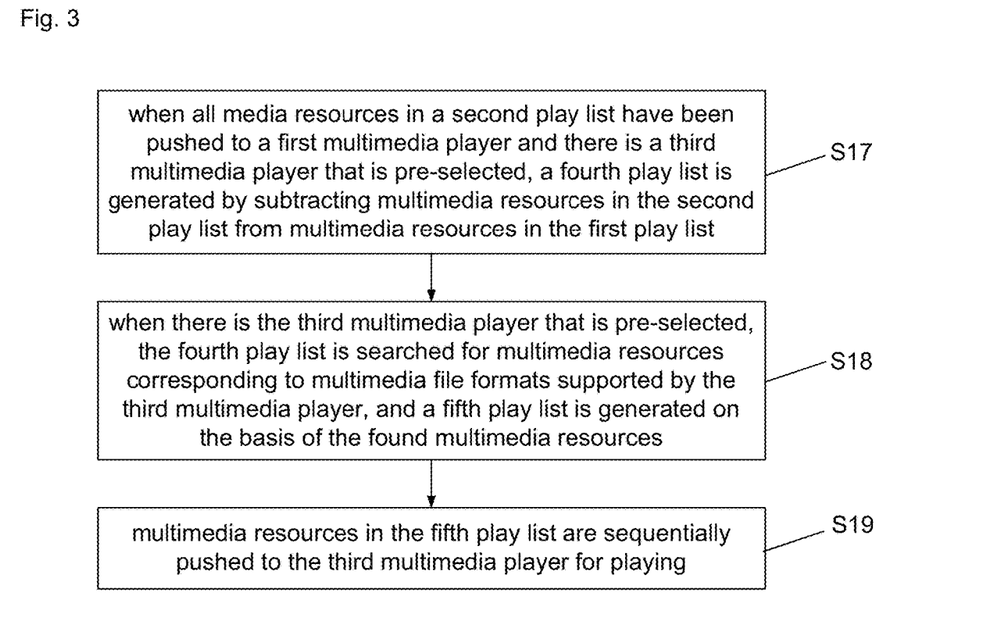
FIG. 3 is a flowchart of a third embodiment for a method for playing multimedia resources according to embodiments of the present disclosure.

As shown in FIG. 3, FIG. 3 is a flowchart of a third embodiment for a method for playing multimedia resources according to embodiments of the present disclosure.

On the basis of the first embodiment or the second embodiment for the method for playing multimedia resources, after the step S13, the method further includes that:

S17: when all the media resources in the second play list have been pushed to the first multimedia player and there is the third multimedia player that is pre-selected, a fourth play list is generated by subtracting the multimedia resources in the second play list from the multimedia resources in the first play list.

An identification state of each multimedia resource in the second play list is checked. If the identification states of all the multimedia resources are "PLAYED", it is shown that all the media resources in the second play list have been pushed to the first multimedia player for playing. If the first play list generated in step S10 includes 100 multimedia resources including the user identity information and the second play list generated in step S12 includes 40 multimedia resources selected from the first play list, then the multimedia resources in the second play list are subtracted from the multimedia resources in the first play list to obtain 60 multimedia resources which are not played by the first multimedia player to generate the fourth play list, and the fourth play list includes the multimedia resources which are not played.

S18: when there is the third multimedia player that is pre-selected, the fourth play list is searched for multimedia resources corresponding to multimedia file formats supported by the third multimedia player, and a fifth play list is generated on the basis of the found multimedia resources.

After the user uses the multimedia resources which have been played by the first multimedia player and in which the user is interested, due to the fact that some multimedia resources in the first play list cannot be played in the first multimedia player, the user needs to select a multimedia player different from the first multimedia player in the multimedia player list as the third multimedia player. If the first multimedia player is the first DMP, then the user may select the second DMP as the third multimedia player.

In step S18, the fourth play list is searched for the multimedia resources corresponding to the multimedia file formats supported by the third multimedia player. If the third multimedia player is the second DMP and the multimedia file formats supported by the second DMP are MPEG and AVI, then the third play list is searched for the multimedia resources of which the multimedia file formats are the MPEG and AVI formats, and the fifth play list is generated by the found multimedia resources meeting requirements.

S19: multimedia resources in the fifth play list are sequentially pushed to the third multimedia player for playing.

In the step S19, a first multimedia resource in the fifth play list is firstly pushed to the first multimedia player, and when feedback information received from the third multimedia player is "HAVE BEEN PLAYED", the played multimedia resource is marked as "PLAYED", a next multimedia resource in the fifth play list is pushed to the third multimedia player, and when the feedback information received from the third multimedia player is "HAVE BEEN PLAYED", next multimedia resources are sequentially pushed to the third multimedia player.

Figure 4:
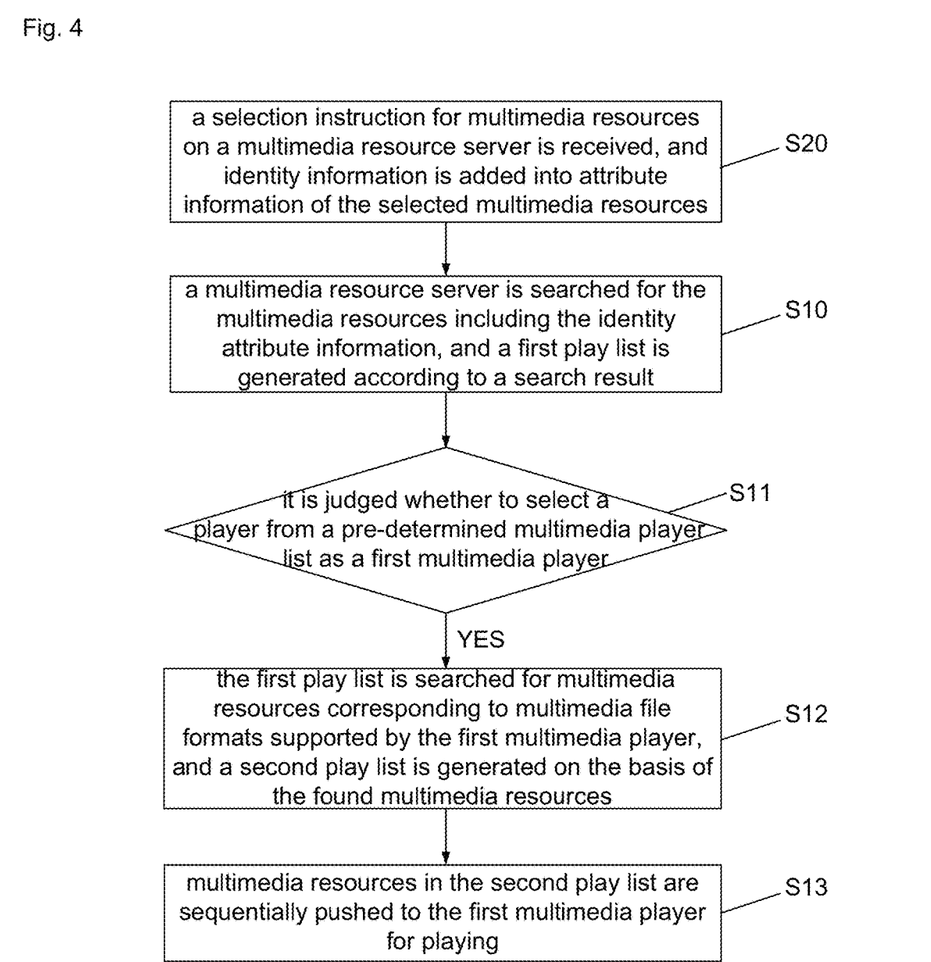
FIG. 4 is a flowchart of a fourth embodiment for a method for playing multimedia resources according to embodiments of the present disclosure.

As shown in FIG. 4, FIG. 4 is a flowchart of a fourth embodiment for a method for playing multimedia resources according to embodiments of the present disclosure.

On the basis of the first embodiment, the second embodiment or the third embodiment for the method for playing multimedia resources, before step S10, the method further includes that:

S20: a selection instruction for the multimedia resources on the multimedia resource server is received, and identity information is added into attribute information of the selected multimedia resources.

In step S20, the user logs in a DLNA system using his/her own identity information and can select multimedia resources in the multimedia resource server. For example, after the user logs in the DLNA system, the system acquires a multimedia resource catalogue from each multimedia resource server, and classes and displays the multimedia resources (for example, the multimedia resources are classified into domestically produced dramas, American dramas, Hong Kong and Taiwan dramas, comedies, thriller dramas and the like), the user browses the classed and displayed multimedia resources, and when seeing favourite multimedia resources, the user selects the favourite multimedia resources. In step S20, the identity information of the user is added into multimedia file attributes of the multimedia resources selected by the user. For example, the identity information 123456 of the user is added into the attribute information of the multimedia resources selected by the user.

Figure 5:
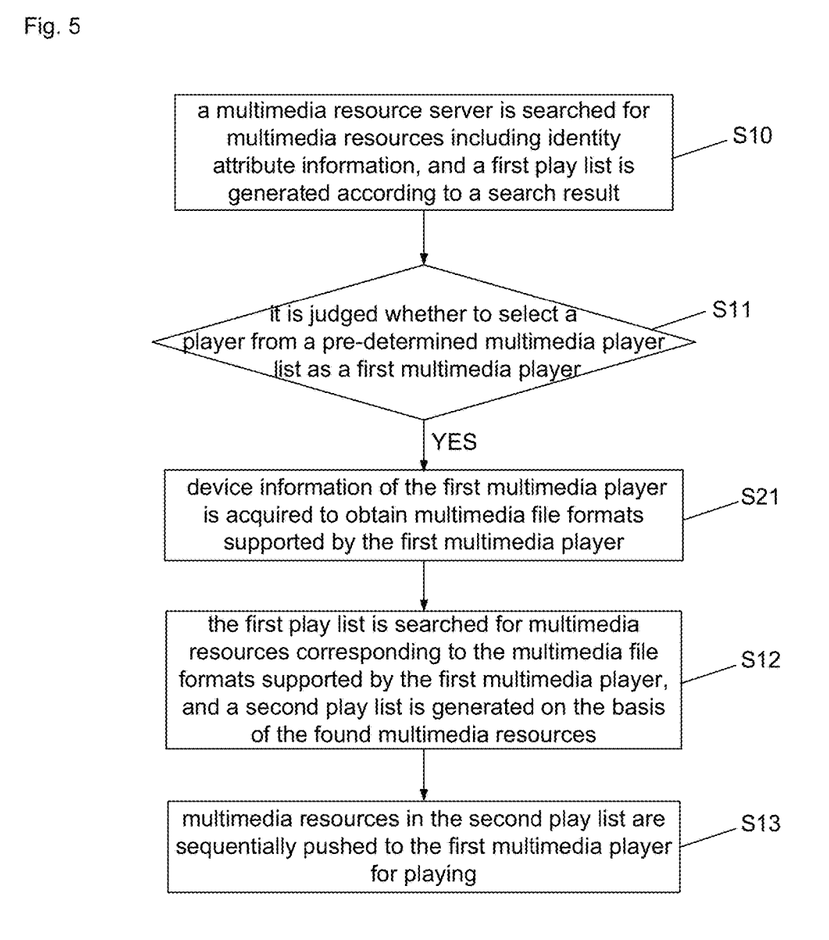
FIG. 5 is a flowchart of a fifth embodiment for a method for playing multimedia resources according to embodiments of the present disclosure.

As shown in FIG. 5, FIG. 5 is a flowchart of a fifth embodiment for a method for playing multimedia resources according to embodiments of the present disclosure.

On the basis of the first embodiment, the second embodiment, the third embodiment or the fourth embodiment for the method for playing multimedia resources, before step S12, the method further includes that:

S21: device information of the first multimedia player is acquired to obtain the multimedia file formats supported by the first multimedia player.

In step S21, the device information of the first multimedia player is acquired. For example, the software configuration information and hardware configuration information of the first multimedia player are acquired.

Figure 6:
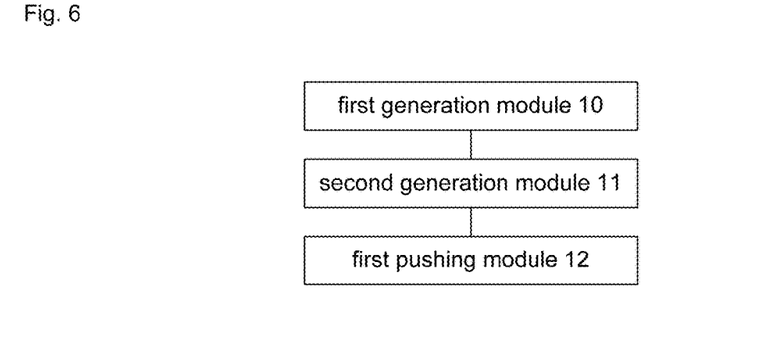
FIG. 6 is a structural diagram of a first embodiment for an apparatus for playing multimedia resources according to embodiments of the present disclosure.

As shown in FIG. 6, FIG. 6 is a structural diagram of a first embodiment for an apparatus for playing multimedia resources according to embodiments of the present disclosure. The apparatus includes a first generation module 10, a second generation module 11 connected to the first generation module 10, and a first pushing module 12 connected to the second generation module 11, wherein the first generation module 10 is configured to search a multimedia resource server for multimedia resources including identity attribute information, and generate a first play list according to a search result;

the second generation module 11 is configured to search, when there is a first multimedia player that is pre-selected, the first play list for multimedia resources corresponding to multimedia file formats supported by the first multimedia player, and generate a second play list on the basis of the found multimedia resources; and the first pushing module 12 is configured to sequentially push multimedia resources in the second play list to the first multimedia player for playing.

In a home network, at least one multimedia resource server can be included. In this embodiment, the multimedia resource server may be a DMS. Formats of multimedia resources stored in each DMS can be the same or can be different. For example, one DMS stores multimedia resources in an MPEG format, another DMS stores multimedia resources in an MPEG format and a 3GP format, and another DMS stores multimedia resources in an MPEG format, a 3GP format, an AVI format, an ASF format, a WMV format and an RMVB format.

The first generation module 10 searches each multimedia resource server in the home network for the multimedia resources including identity information, the identity information is user identity information; if the user identity information is 123456, then each multimedia resource server is searched for the multimedia resources including the user identity information 123456, and the first play list is generated by the found multimedia resources meeting requirements, that is, all the attribute information of the multimedia resources in the first play list includes the user identity information 123456, and the multimedia resources in the first play list are multimedia resources in which a user having the identity information 123456 is interested.

In the home network, at least one multimedia player can be included, which can be a DMP or a DMR, available multimedia players are added into a multimedia player list, each multimedia player in the multimedia player list can support at least one multimedia file format, and the multimedia file formats supported by all the multimedia players can be totally or partially the same or can be totally different. The user can select any one multimedia player from the multimedia player list as the first multimedia player. For example, the multimedia player list includes a first DMP, a second DMP, a first DMR, a second DMR and the like, and the user can select the first DMP as the first multimedia player.

The second generation module 11 searches the first play list for the multimedia resources corresponding to the multimedia file formats supported by the first multimedia player. If the first multimedia player is the first DMP and the multimedia file formats supported by the first DMP are MPEG and 3GP, then the first play list is searched for the multimedia resources of which the multimedia file formats are the MPEG and 3GP, the second play list is generated by the found multimedia resources meeting requirements, that is, multimedia file attributes of multimedia resources in the second play list include the user identity information 123456, and the multimedia resources in the second play list are multimedia resources which can be played by the first multimedia player.

The second generation module 11 includes an acquisition unit, which is configured to acquire device information of the first multimedia player to obtain the multimedia file formats supported by the first multimedia player. For example, the software configuration information and hardware configuration information of the first multimedia player are acquired.

The first pushing module 12 pushes a first multimedia resource in the second play list to the first multimedia player, and when feedback information received from the first multimedia player is "HAVE BEEN PLAYED", the played multimedia resource is marked as "PLAYED", a next multimedia resource in the second play list is pushed to the first multimedia player, and when the feedback information received from the first multimedia player is "HAVE BEEN PLAYED", next multimedia resources are sequentially pushed to the first multimedia player.

In practical application, the first generation module 10, the second generation module 11 and the first pushing module 12 in the apparatus for playing multimedia resources can be realized by a Central Processing Unit (CPU) or a Digital Signal Processor (DSP) or a Field-Programmable Gate Array (FPGA) in the apparatus for playing multimedia resources.

Figure 7:
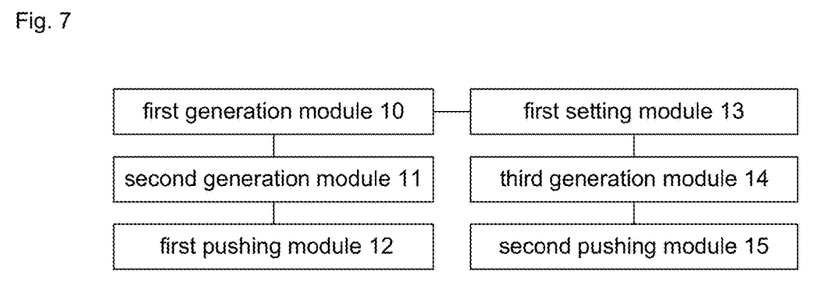
FIG. 7 is a structural diagram of a second embodiment for an apparatus for playing multimedia resources according to embodiments of the present disclosure.

As shown in FIG. 7, FIG. 7 is a structural diagram of a second embodiment for an apparatus for playing multimedia resources according to embodiments of the present disclosure.

On the basis of the first embodiment for the apparatus for playing multimedia resources, the apparatus further includes a first setting module 13 connected to the first generation module 10, a third generation module 14 connected to the first setting module 13, and a second pushing module 15 connected to the third generation module 14, wherein the first setting module 13 is configured to determine, when the first multimedia player is not pre-selected, a multimedia player which supports playing of maximum multimedia resources in the first play list from a pre-determined multimedia player list, and set the determined multimedia player as a second multimedia player;

the third generation module 14 is configured to generate a third play list according to the multimedia resources in the first play list, which are supported to be played by the second multimedia player; and the second pushing module 15 is configured to sequentially push multimedia resources in the third play list to the second multimedia player for playing.

When a judgment result of the first judgment module 11 shows that a player is not selected from the pre-determined multimedia player list as the first multimedia player, a multimedia player is selected from the pre-determined multimedia player list as the second multimedia player via the first setting module 13. Specifically, the number of the multimedia resources in the first play list, which are supported to be played by each multimedia player in the multimedia player list, is acquired. For example, the number of the multimedia resources in the first play list, which are supported to be played by the first DMP, is 10, the number of the multimedia resources in the first play list, which are supported to be played by the second DMP, is 20, the number of the multimedia resources in the first play list, which are supported to be played by the first DMR, is 30, and the number of the multimedia resources in the first play list, which are supported to be played by the second DMR, is 40; the second DMR capable of playing the maximum multimedia resources in the first multimedia player list is set as the second multimedia player.

The third generation module 14 is configured to search the first play list for multimedia resources corresponding to multimedia file formats supported by the second multimedia player. If the second multimedia player is the second DMR and the multimedia file formats supported by the second DMR are MPEG, 3GP, RMVB and AVI, then the first play list is searched for the multimedia resources of which the multimedia file formats are the MPEG, 3GP, RMVB and AVI, and the third play list is generated by the found multimedia resources meeting requirements.

The second pushing module 15 is configured to sequentially push multimedia resources in the third play list to the second multimedia player for playing. Specifically, a first multimedia resource in the third play list is firstly pushed to the second multimedia player, and when feedback information received from the second multimedia player is "HAVE BEEN PLAYED", the played multimedia resource is marked as "PLAYED", a next multimedia resource in the third play list is pushed to the second multimedia player, and when the feedback information received from the second multimedia player is "HAVE BEEN PLAYED", next multimedia resources are sequentially pushed to the second multimedia player.

In practical application, the first generation module 10, the second generation module 11, the first pushing module 12, the first setting module 13, the third generation module 14 and the second pushing module 15 in the apparatus for playing multimedia resources can be realized by the CPU or the DSP or the FPGA in the apparatus for playing multimedia resources.

Figure 8:
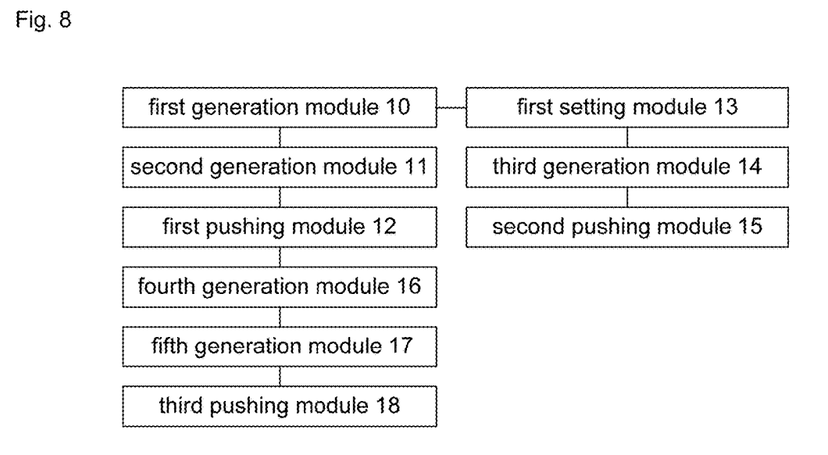
FIG. 8 is a structural diagram of a third embodiment for an apparatus for playing multimedia resources according to embodiments of the present disclosure.

As shown in FIG. 8, FIG. 8 is a structural diagram of a third embodiment for an apparatus for playing multimedia resources according to embodiments of the present disclosure.

On the basis of the first embodiment or the second embodiment for the apparatus for playing multimedia resources, the apparatus further includes a fourth generation module 16 connected to the first pushing module 12, a fifth generation module 17 connected to the fourth generation module 16, and a third pushing module 18 connected to the fifth generation module 17, wherein the fourth generation module 16 is configured to generate, when all media resources in the second play list have been pushed to the first multimedia player by the first pushing module and there is a third multimedia player that is pre-selected, a fourth play list by subtracting the multimedia resources in the second play list from the multimedia resources in the first play list;

the fifth generation module 17 is configured to search, when there is the third multimedia player that is pre-selected, the fourth play list for multimedia resources corresponding to multimedia file formats supported by the third multimedia player, and generate a fifth play list on the basis of the found multimedia resources; and the third pushing module 18 is configured to sequentially push multimedia resources in the fifth play list to the third multimedia player for playing.

The fourth generation module 16 is configured to check an identification state of each multimedia resource in the second play list. If the identification states of all the multimedia resources are "PLAYED", it is shown that all the media resources in the second play list have been pushed to the first multimedia player for playing.

The fourth generation module 16 is configured to generate, when all the media resources in the second play list have been pushed to the first multimedia player and there is the third multimedia player that is pre-selected, the fourth play list by subtracting the multimedia resources in the second play list from the multimedia resources in the first play list. If the first play list includes 100 multimedia resources including the user identity information and the second play list includes 40 multimedia resources selected from the first play list, the multimedia resources in the second play list are subtracted from the multimedia resources in the first play list to obtain 60 multimedia resources which are not played by the first multimedia player to generate the fourth play list, and the fourth play list includes the multimedia resources which are not played.

After the user uses the multimedia resources which have been played by the first multimedia player and in which the user is interested, due to the fact that some multimedia resources in the first play list cannot be played in the first multimedia player, the user needs to select a multimedia player different from the first multimedia player in the multimedia player list as the third multimedia player. If the first multimedia player is the first DMP, the user can select the second DMP as the third multimedia player.

The fifth generation module 17 is configured to search the fourth play list for the multimedia resources corresponding to the multimedia file formats supported by the third multimedia player. If the third multimedia player is the second DMP and the multimedia file formats supported by the second DMP are MPEG and AVI, the third play list is searched for the multimedia resources which are in MPEG and AVI multimedia file formats, and the fifth play list is generated by the found multimedia resources meeting requirements.

The third pushing module 18 is configured to sequentially push the multimedia resources in the fifth play list to the third multimedia player for playing. Specifically, a first multimedia resource in the fifth play list is firstly pushed to the first multimedia player, and when feedback information received from the third multimedia player is "HAVE BEEN PLAYED", the played multimedia resource is marked as "PLAYED", a next multimedia resource in the fifth play list is pushed to the third multimedia player, and when the feedback information received from the third multimedia player is "HAVE BEEN PLAYED", next multimedia resources are sequentially pushed to the third multimedia player.

In practical application, the first generation module 10, the second generation module 11, the first pushing module 12, the first setting module 13, the third generation module 14, the second pushing module 15, the fourth generation module 16, the fifth generation module 17 and the third pushing module 18 in the apparatus for playing multimedia resources can be realized by the CPU or the DSP or the FPGA in the apparatus for playing multimedia resources.

Figure 9:
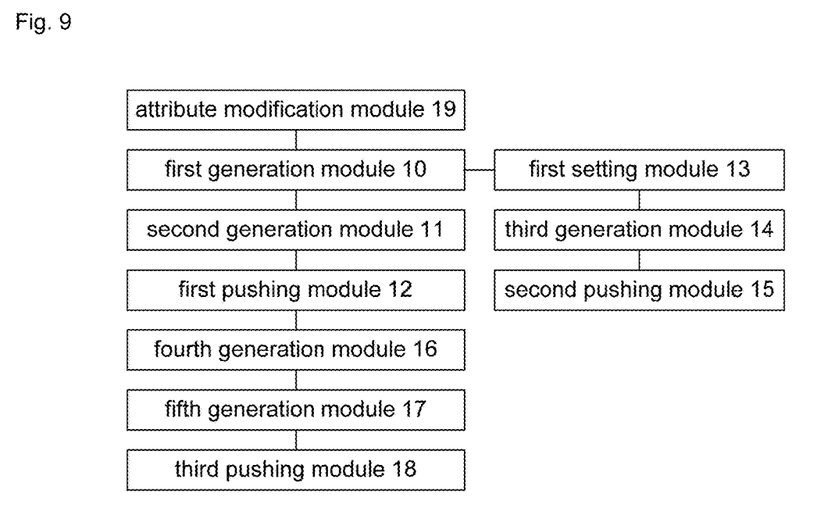
FIG. 9 is a structural diagram of a fourth embodiment for an apparatus for playing multimedia resources according to embodiments of the present disclosure.

As shown in FIG. 9, FIG. 9 is a structural diagram of a fourth embodiment for an apparatus for playing multimedia resources according to embodiments of the present disclosure.

On the basis of the first embodiment, the second embodiment or the third embodiment for the apparatus for playing multimedia resources, the apparatus further includes an attribute modification module 19 connected to the first generation module 10, the attribute modification module 19 being configured to receive a selection instruction for the multimedia resources on the multimedia resource server, and add identity information into attribute information of the selected multimedia resources.

The user logs in a DLNA system using his/her own identity information and can select the multimedia resources in the multimedia resource server. For example, after the user logs in the DLNA system, the system acquires a multimedia resource catalogue from each multimedia resource server, and classes and displays the multimedia resources (for example, the multimedia resources are classified into domestically produced dramas, American dramas, Hong Kong and Taiwan dramas, comedies, thriller dramas and the like), the user browses the classed and displayed multimedia resources, and when seeing favourite multimedia resources, the user selects the favourite multimedia resources via the attribute modification module 19. The attribute modification module 19 is further configured to add the identity information of the user into multimedia file attributes of the multimedia resources selected by the user. For example, the identity information 123456 of the user is added into the attribute information of the multimedia resources selected by the user.

In practical application, the first generation module 10, the second generation module 11, the first pushing module 12, the first setting module 13, the third generation module 14, the second pushing module 15, the fourth generation module 16, the fifth generation module 17, the third pushing module 18 and the attribute modification module 19 in the apparatus for playing multimedia resources can be realized by the CPU or the DSP or the FPGA in the apparatus for playing multimedia resources.

The above is only the preferred embodiments of the present disclosure and does not limit the patent scope of the present disclosure accordingly. The equivalent structure or equivalent flow conversion performed by utilizing the description and drawings of the present disclosure or direct or indirect application to other relevant technical fields may fall within the patent protection scope of the present disclosure in the same way.

What is claimed is:

1. A method for playing multimedia resources, comprising:
    searching a multimedia resource server for multimedia resources including identity attribute information of a user, and generating a first play list according to a search result;
    when there is a first multimedia player that is pre-selected, searching the first play list for multimedia resources corresponding to multimedia file formats supported by the first multimedia player, and generating a second play list on the basis of the found multimedia resources; and
    sequentially pushing multimedia resources in the second play list to the first multimedia player for playing;
    wherein after the multimedia resource server is searched for the multimedia resources including the identity attribute information of the user and the first play list is generated according to the search result, the method further comprises:
    when the first multimedia player is not pre-selected, determining a multimedia player which supports playing of a maximum number of multimedia resources corresponding to a multimedia file format in the first play list from a pre-determined multimedia player list, and setting the determined multimedia player as a second multimedia player;
    generating a third play list according to the multimedia resources in the first play list, which are supported to be played by the second multimedia player; and
    sequentially pushing multimedia resources in the third play list to the second multimedia player for playing.

2. The method according to claim 1, wherein after the multimedia resources in the second play list are sequentially pushed to the first multimedia player for playing, the method further comprises:
    when all media resources in the second play list have been pushed to the first multimedia player and there is a third multimedia player that is pre-selected, generating a fourth play list by subtracting the multimedia resources in the second play list from the multimedia resources in the first play list;
    when there is the third multimedia player that is pre-selected, searching the fourth play list for multimedia resources corresponding to multimedia file formats supported by the third multimedia player, and generating a fifth play list on the basis of the found multimedia resources; and
    sequentially pushing multimedia resources in the fifth play list to the third multimedia player for playing.

3. The method according to claim 2, wherein before the multimedia resource server is searched for the multimedia resources including the identity attribute information of the user and the first play list is generated according to the search result, the method further comprises:
    receiving a selection instruction for the multimedia resources on the multimedia resource server, and adding identity information of the user into attribute information of the selected multimedia resources.

4. The method according to claim 3, wherein before the first play list is searched for the multimedia resources corresponding to the multimedia file formats supported by the first multimedia player and the second play list is generated on the basis of the found multimedia resources, the method further comprises:
    acquiring device information of the first multimedia player to obtain the multimedia file formats supported by the first multimedia player.

5. An apparatus for playing multimedia resources, comprising a first generation module, a second generation module connected to the first generation module, and a first pushing module connected to the second generation module, wherein
    the first generation module is configured to search a multimedia resource server for multimedia resources including identity attribute information of a user, and generate a first play list according to a search result;
    the second generation module is configured to search, when there is a first multimedia player that is pre-selected, the first play list for multimedia resources corresponding to multimedia file formats supported by the first multimedia player, and generate a second play list on the basis of the found multimedia resources; and
    the first pushing module is configured to sequentially push multimedia resources in the second play list to the first multimedia player for playing;
    wherein the apparatus further comprises: a first setting module connected to the first generation module, a third generation module connected to the first setting module, and a second pushing module connected to the third generation module, wherein
    the first setting module is configured to determine, when the first multimedia player is not pre-selected, a multimedia player which supports playing of a maximum number of multimedia resources corresponding to a multimedia file format in the first play list from a pre-determined multimedia player list, and set the determined multimedia player as a second multimedia player;

the third generation module is configured to generate a third play list according to the multimedia resources in the first play list, which are supported to be played by the second multimedia player; and the second pushing module is configured to sequentially push multimedia resources in the third play list to the second multimedia player for playing.

6. The apparatus according claim 5, further comprising a fourth generation module connected to the first pushing module, a fifth generation module connected to the fourth generation module, and a third pushing module connected to the fifth generation module, wherein the fourth generation module is configured to generate, when all media resources in the second play list have been pushed to the first multimedia player by the first pushing module and there is a third multimedia player that is pre-selected, a fourth play list by subtracting the multimedia resources in the second play list from the multimedia resources in the first play list;

the fifth generation module is configured to search, when there is the third multimedia player that is pre-selected, the fourth play list for multimedia resources corresponding to multimedia file formats supported by the third multimedia player, and generate a fifth play list on the basis of the found multimedia resources; and the third pushing module is configured to sequentially push multimedia resources in the fifth play list to the third multimedia player for playing.

7. The apparatus according to claim 6, further comprising an attribute modification module connected to the first generation module, the attribute modification module being configured to receive a selection instruction for the multimedia resources on the multimedia resource server, and add identity information of the user into attribute information of the selected multimedia resources.

8. The apparatus according to claim 7, wherein the second generation module comprises an acquisition unit which is configured to acquire device information of the first multimedia player to obtain the multimedia file formats supported by the first multimedia player.

9. A non-transitory computer-readable storage medium having stored therein instructions that, when executed by a processor of a terminal, causes the terminal to perform a method for playing multimedia resources, the method comprising:

searching a multimedia resource server for multimedia resources including identity attribute information of a user, and generating a first play list according to a search result;

when there is a first multimedia player that is pre-selected, searching the first play list for multimedia resources corresponding to multimedia file formats supported by the first multimedia player, and generating a second play list on the basis of the found multimedia resources; and sequentially pushing multimedia resources in the second play list to the first multimedia player for playing;

wherein the method further comprises:

when the first multimedia player is not pre-selected, determining a multimedia player which supports playing of a maximum number of multimedia resources corresponding to a multimedia file format in the first play list from a pre-determined multimedia player list, and setting the determined multimedia player as a second multimedia player;

generating a third play list according to the multimedia resources in the first play list, which are supported to be played by the second multimedia player; and sequentially pushing multimedia resources in the third play list to the second multimedia player for playing.

10. The non-transitory computer-readable storage medium having stored therein instructions that, when executed by the processor of the terminal, causes the terminal to perform the method for playing multimedia resources according to claim 9, wherein the method further comprises:

when all media resources in the second play list have been pushed to the first multimedia player and there is a third multimedia player that is pre-selected, generating a fourth play list by subtracting the multimedia resources in the second play list from the multimedia resources in the first play list;

when there is the third multimedia player that is pre-selected, searching the fourth play list for multimedia resources corresponding to multimedia file formats supported by the third multimedia player, and generating a fifth play list on the basis of the found multimedia resources; and sequentially pushing multimedia resources in the fifth play list to the third multimedia player for playing.

11. The non-transitory computer-readable storage medium having stored therein instructions that, when executed by the processor of the terminal, causes the terminal to perform the method for playing multimedia resources according to claim 10, wherein the method further comprises:

receiving a selection instruction for the multimedia resources on the multimedia resource server, and adding identity information of the user into attribute information of the selected multimedia resources.

12. The non-transitory computer-readable storage medium having stored therein instructions that, when executed by the processor of the terminal, causes the terminal to perform the method for playing multimedia resources according to claim 11, wherein the method further comprises:

acquiring device information of the first multimedia player to obtain the multimedia file formats supported by the first multimedia player.

* * * * *